United States Patent [19]

Kozuka et al.

[11] 4,087,083

[45] May 2, 1978

[54] MANIPULATOR

[75] Inventors: Goro Kozuka, Nagoya; Akira Matsui, Omi; Yoshiaki Yoshida, Omi; Katsuhiko Fujimoto, Omi; Shigeo Okada, Tokai; Seiji Nonoyama, Aichi; Yukihiko Kato, Nagoya; Hideshi Hirose, Chita, all of Japan

[73] Assignees: A. Daidoseiko K.K., Nagoya; B. Denkikagakukogyo K.K., Tokyo, both of Japan

[21] Appl. No.: 694,259

[22] Filed: Jun. 9, 1976

[30] Foreign Application Priority Data

| Jun. 10, 1975 | Japan | 50-71269 |
| Jun. 10, 1975 | Japan | 50-71270 |
| Jun. 10, 1975 | Japan | 50-78483[U] |
| Jun. 10, 1975 | Japan | 50-78485[U] |
| Jun. 10, 1975 | Japan | 50-79673[U] |

[51] Int. Cl.² .............................................. C21B 7/12
[52] U.S. Cl. .................................. 266/273; 266/271; 214/1 CM
[58] Field of Search ............................ 266/271–273; 13/33; 432/239; 408/11; 214/1 CM; 318/628; 91/363 R, 363 A, 370–373, 434

[56] References Cited

U.S. PATENT DOCUMENTS

| 1,013,153 | 1/1912 | Gerwig | 266/273 |
| 1,064,604 | 6/1913 | Boudreau | 266/273 |
| 1,376,935 | 5/1921 | Griggs | 266/271 |
| 1,537,901 | 5/1925 | Tharaldsen | 266/272 |
| 2,689,318 | 9/1954 | Goertz et al. | 318/628 |
| 2,861,701 | 11/1958 | Bergsland et al. | 214/1 CM |
| 2,967,316 | 1/1961 | Kandle | 266/271 |
| 3,584,524 | 6/1971 | Langenbach | 408/11 |
| 3,819,061 | 6/1974 | Andersson et al. | 214/1 CM |

*Primary Examiner*—Gerald A. Dost
*Attorney, Agent, or Firm*—William Anthony Drucker

[57] ABSTRACT

Disclosed is a manipulator which is particularly suitable for tapping a furnace. The manipulator includes an elongate arm which is axially reciprocable and rotatable in a vertical and a horizontal plane, and a handle for operating the arm for its axial reciprocal movement and vertical or horizontal rotation. The manipulator is particularly characterized by the provision of a bilateral servo system interconnecting between the arm and the handle for feeding back to the handle any variation in the force acting on the arm under operation.

7 Claims, 20 Drawing Figures

MANIPULATOR

This invention relates to a manipulator and more particularly, to a manipulator adapted for performing a series of tapping operation for an electric furnace for carbide manufacture.

It has been the usual practice in the art of carbide manufacture to tap a furnace manually by using a graphite rod to heat the vicinity of a tapping hole by arc discharge and a metal rod to perform a series of tapping work. There have been proposed a number of mechanical devices for performing a part of tapping work, including a device for supplying clay automatically to close the tapping hole after the furnace is discharged, and a manipulator of simple construction for removing carbide from the vicinity of the tapping hole. But none of such devices have been used successfully on a commercial basis because of their inferior operability.

The conventional apparatus have a number of drawbacks. These drawbacks may be primarily attributed to the fact that mere repetition of mechanical actions is not sufficient to provide a satisfactory tapping operation which necessitates a substantial degree of judgment by human eyes. In view of this fact, it is a general object of this invention to provide a manipulator which the operator can operate under remote control by making full use of his visual judgment of the work being performed by the manipulator.

It is another object of this invention to provide a manipulator which is operable to perform a certain series of repetitive operations in as flexible a fashion as they are performed manually. According to one aspect of this invention, the force acting on the output end of the manipulator is fed back to the input side thereof during the axial movement of its operating arm or its rotation in a vertical or horizontal plane. Thus, the operator can feel on his handle the force acting on the front end of the manipulator arm. This feature permits the operator to control the operation of the manipulator with the aid of his visual judgment as freely as if he were doing the tapping work manually.

According to this invention, there is, therefore, provided a tapping manipulator including an operating arm supported on a mobile support structure and adapted for movement within a predetermined three-dimensional space, an operating handle provided in an operating cabinet installed on the support structure or in any other appropriate location, and a servo mechanism or a combination of a servo mechanism and a force feedback system associated with the operating handle, whereby the operator situated in front of the operating handle can remotely control the operation of the operating arm to maintain the optimum operational flexibility of the arm.

The present manipulator adapted for remote control can very advantageously be used to effect the tapping operation of a carbide furnace under high heat quite safely. The provision of a bilateral servo system allows for as easy or even easier tapping operation than is performed manually, so that the manpower required for the tapping operation can be drastically reduced.

The manipulator known in the art for tapping a carbide furnace employs a number of rods and tools selectively. During the tapping operation, it is frequently necessary to change one rod or tool to another and this must be done quickly. Such a rod or tool is usually attached to a manipulator arm by using a grip or wedge type holder to which the rod or tool is held by bolts. The rod or tool is attached or detached manually and such manual work often tends to present a critical problem to the safety of the operator. Moreover, the work is very hard because of the weight of the rod, etc. and cannot be accomplished quickly. Accordingly, the conventional manipulator is operable only with a substantially low working efficiency.

It is another object of this invention to eliminate the aforementioned drawbacks and provide a mechanical device for attaching a tapping rod to the operating arm of a manipulator and detaching it therefrom.

The tapping operation for a carbide furnace requires frequent three-dimensional movement of a tapping rod, i.e., axially and rotatably in a vertical and a horizontal plane. The tapping rod is usually made of graphite, which is very inferior to, for example, steel in strength, and is very likely to break under a strong impact or pressure. Although this invention can successfully solve this problem by the feedback effects as hereinbefore described which permit the operator to manipulate the tapping rod in response to the impact or pressure acting on it as if he were handling the rod manually it is still another object of this invention to provide a manipulator having an operating arm on which a tapping rod may be resiliently supported, whereby the possibility of breakage or failure of the tapping rod can be minimized.

The tapping rod used for the conventional manipulator is unsatisfactory in another respect, too. It is very likely to become useless in a short time by distortion as it gets red hot when it is inserted in the tapping hole of a furnace. Molten carbide adheres to the free end of the tapping rod which is inserted into the tapping hole of the furnace. The end portion thus covered with carbide may be protected against heat, but the rod often becomes distorted in that area behind the carbide layer which is exposed to heat. Such distortion naturally causes a substantial problem to the continuation of the tapping operation and necessitates frequent change of the rod to a new one. It is, therefore, a further object of this invention to provide an improved tapping rod of the double walled construction which may be filled with a cooling medium and thereby cooled uniformly throughout that portion which may be exposed to a high furnace temperature. Thus, any distortion of the rod that might otherwise be caused by temperature differences from one rod portion to another can successfully be prevented according to this invention.

Another problem hitherto encountered in connection with the tapping of an electric furnace for the manufacture of carbide or ferroalloys is concerned with the closing of a tapping hole after the furnace is discharged. Conventionally, the tapping hole is closed manually by using a rod carrying at its end a spatula on which mud or clay is placed and pressed into the tapping hole as the rod is advanced manually. This method is, however, unsatisfactory, because continual variation in the shape and size of the hole to be closed makes it essential to frequently change the size of a mass of mud to suit the hole. Such mud insertion must be repeated a number of time until the hole is totally closed. Thus, the work is very cumbersome and even dangerous since there is every likelihood that molten carbide remaining in the furnace may burst out before the tapping hole is totally closed.

It is, therefore, a still further object of this invention to provide a mechanical device for closing a tapping hole on a furnace, which device is particularly suited for use in conjunction with the manipulator of this invention.

These and other objects, features and advantages of this invention will become apparent from the following description and the accompanying drawings, in which.

Figure 1:
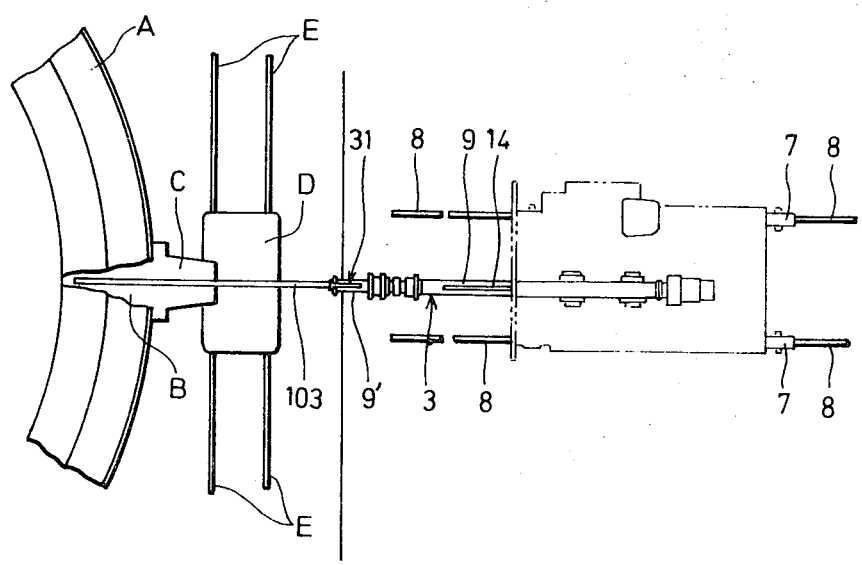
FIG. 1 is a schematic plan view of the manipulator embodying this invention and applied for tapping a carbide furnace.
Figure 2:
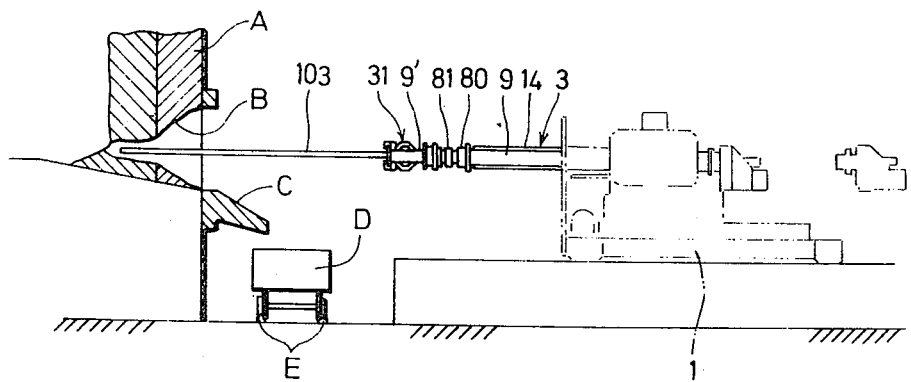
FIG. 2 is a side elevational view of the manipulator shown in FIG. 1.
Figure 3:
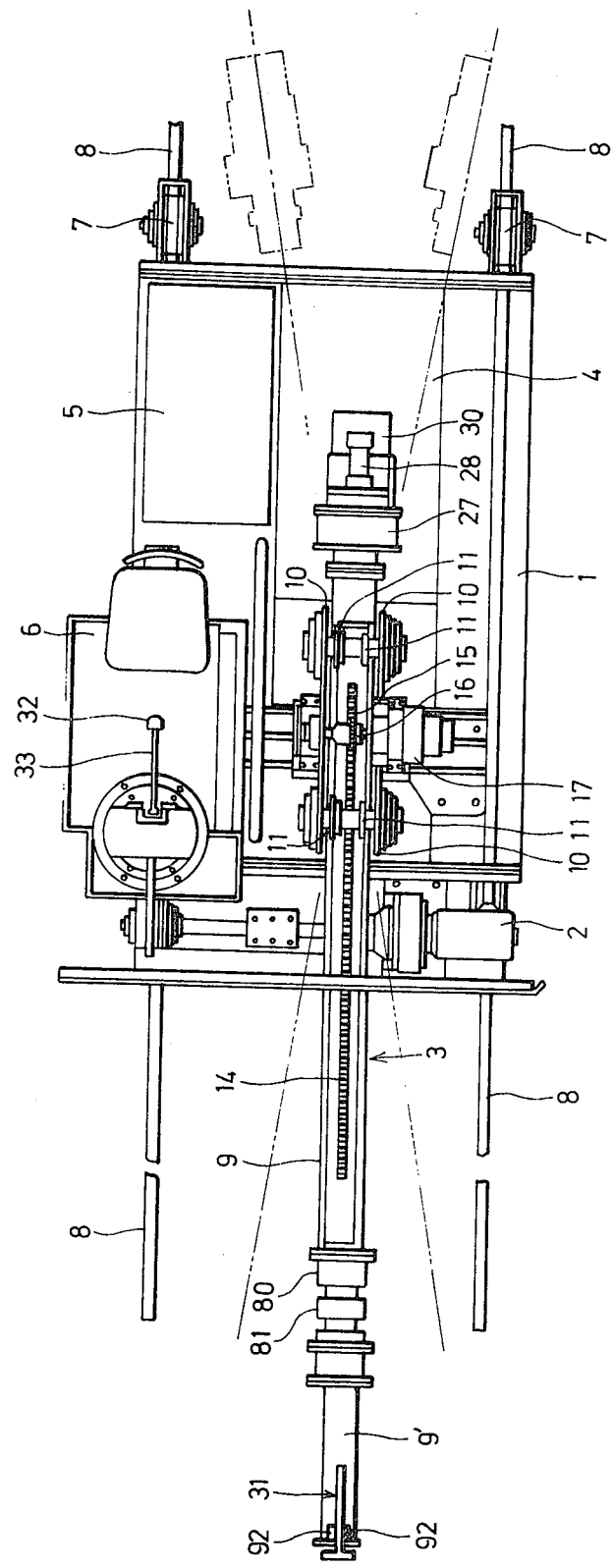
FIG. 3 is an enlarged plan view of the manipulator shown in FIG. 1.
Figure 4:
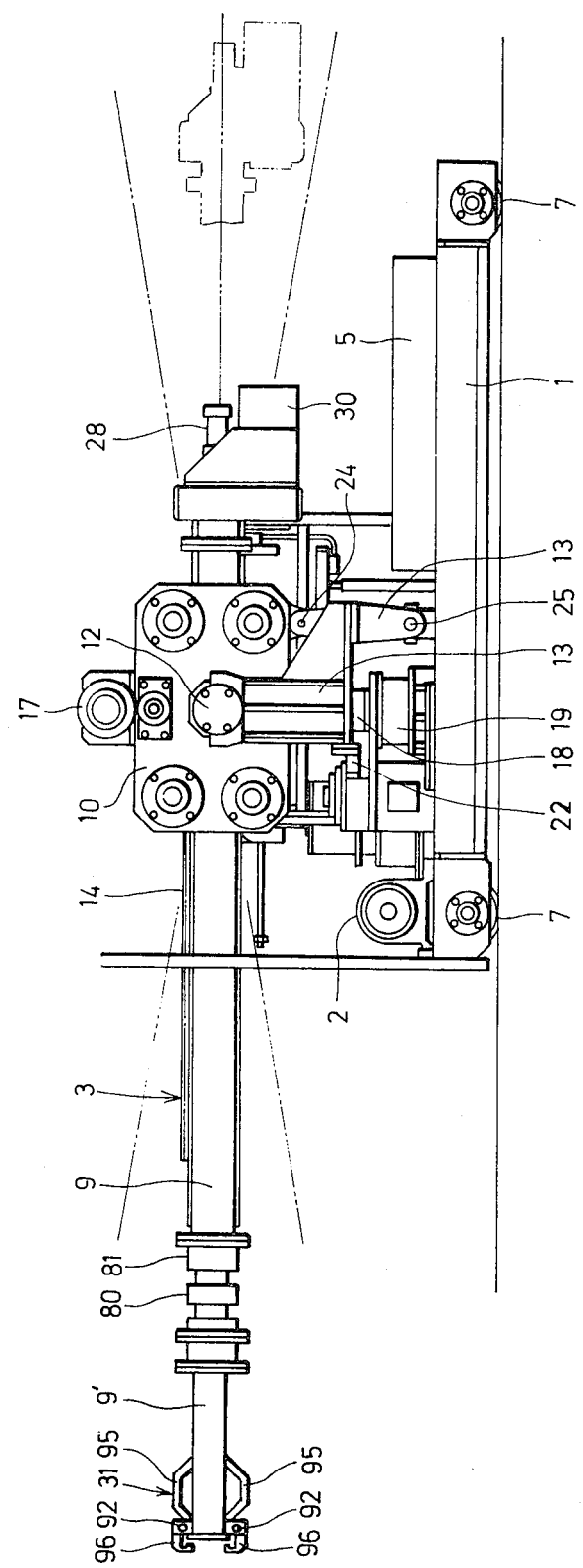
FIG. 4 is a side elevational view of the manipulator shown in FIG. 3.

Referring now to the drawings in further detail and particularly to FIGS. 1 to 4, there is shown a manipulator according to a preferred embodiment of this invention as being supported on a mobile support structure 1. The support structure 1 also carries thereon a driving device 2, a tapping mechanism 3, a hydraulic device 4, a control device 5 and an operating stand 6. The support structure 1 is longitudinally movably supported on two pairs of wheels 7 which are in turn supported on rails 8. A carbide furnace is fragmentarily shown at A, its tapping hole at B, and its spout at C, and a bogie D is shown in front of the furnace A to receive molten carbide therefrom and supported on rails E transversely movably relative to the manipulator. The rails 8 are positioned to locate the tapping mechanism 3 exactly in front of the tapping hole B of the furnace A. The driving device 2 may comprise a geared motor, a hydraulic motor or any other appropriate means adapted for moving the support structure 1 along the rails 8 to and away from the furnace A.

The tapping mechanism 3 includes an operating arm 9 of the hollow cylindrical construction which is supported on the support structure 1 axially movably, and rotatably in a vertical and a horizontal plane. These three kinds of arm motions may be achieved either severally or jointly. The operating arm 9 includes a front end extension which is rotatable about its own axis, and a central shaft which is axially movable.

Figure 5:
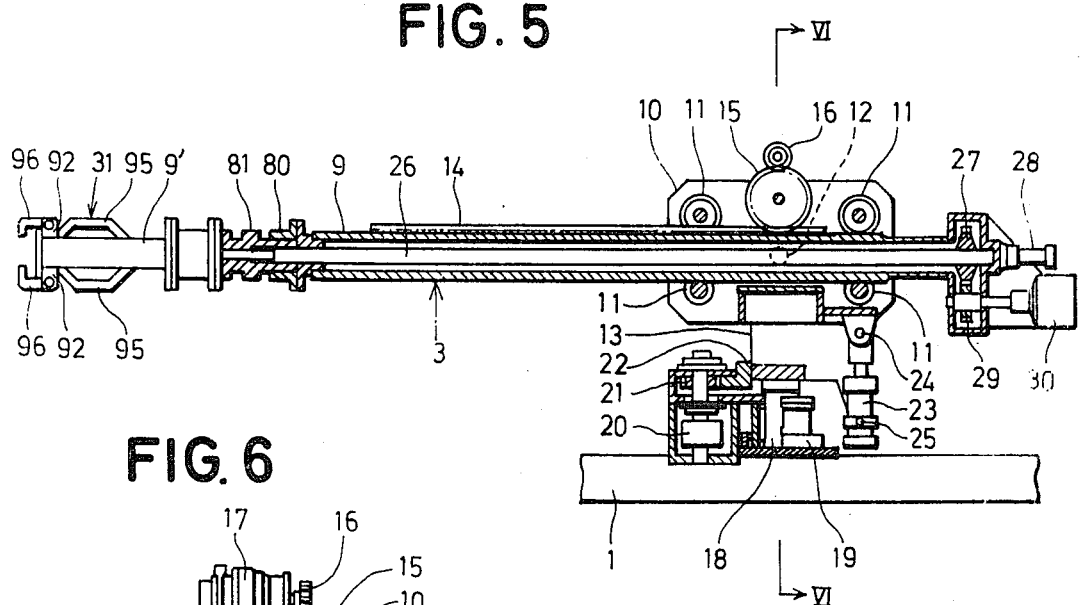
FIG. 5 is a fragmentary longitudinal sectional view of the operating arm on the manipulator of FIGS. 1-4 and its associated mechanisms.
Figure 6:
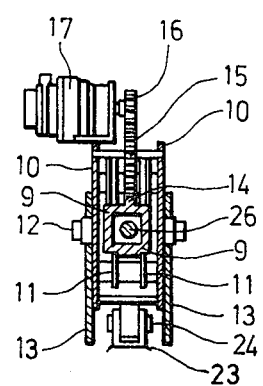
FIG. 6 is a sectional view taken along the line VI—VI of FIG. 5.

Referring now to FIGS. 5 and 6 of the drawings, there is shown a device for moving the operating arm 9 along its own axis. The arm 9 is supported on a pair of upper guide rollers 11 and a pair of lower guide rollers 11 which are both carried on a pair of supporting plates 10. The supporting plates 10 are supported on a pair of frame members 13 by a pin 12. An elongate rack 14 is provided on the arm 9 and engaged with a gear 15 carried on the supporting plates 10. The gear 15 is engaged with another gear 16 on the supporting plates 10 and the latter gear 16 is connected to the output shaft of a hydraulic motor 17 which is also supported on the supporting plates 10. The hydraulic motor 17 is rotated by the hydraulic device 4 in response to an electrical signal from the operating stand 6 to thereby move the arm 9 axially through the cooperative actions of the gears 16 and 15 and the rack 14. Throughout this axial movement, the arm 9 is properly supported and guided by the guide rollers 11.

Description will now be made of the apparatus for rotating the arm 9 in a predetermined horizontal plane. The apparatus includes an upright shaft 18 provided at the bottom of the frame members 13 and rotatably supported within an upright cylindrical support 19 as shown in FIG. 5. A hydraulic motor 20 is mounted on one side of the support 19 on the support structure 1 and has an output shaft on which a gear 21 is attached. The gear 21 is engaged with a spur gear 22 carried on the frame members 13. The hydraulic motor 20 is rotated in response to an electrical signal from the operating stand 6 and this rotation is transmitted through the gears 21 and 22 to rotate the shaft 18 about its own axis to thereby rotate the frame members 13 and the supporting plates 10 in the horizontal plane, whereby the arm 9 is horizontally rotated.

Attention is now directed to the apparatus for rotating the arm 9 in a predetermined vertical plane. As shown in FIGS. 5 and 6, a hydraulic cylinder 23 is vertically disposed between the supporting plates 10 and the frame members 13. The hydraulic cylinder 23 is connected to the supporting plates 10 by a pin 24 and to the frame members 13 by a pin 25. The hydraulic cylinder 23 includes a piston rod which is vertically movable in response to an electrical signal from the operating stand 6 to rotate the supporting plates 10 about the pin 12, whereby the arm 9 is vertically rotated.

The central shaft of the arm 9 is shown at 26 in FIG. 5 and is both axially movable and rotatable about its own axis. A gear 27 is carried on the rear end portion of the central shaft 26 and provides a means for rotating the shaft 26 about its own axis. The gear 27 must not interfere with the axial movement of the shaft 26, while being capable of transmitting rotation to the shaft 26. In this connection, the rear end portion of the shaft 26 on which the gear 27 is supported may preferably be constructed in the form of, for example, a splined shaft. A horizontally disposed hydraulic cylinder 28 is connected to the rear end of the central shaft 26. The gear 27 is engaged with another gear 29 to which the output shaft of a hydraulic actuator 30 is connected. The hydraulic cylinder 28 is operable to move the central shaft 26 along its axis and the hydraulic actuator 30 operates to cause the gears 29 and 27 to rotate the shaft 26 by 180° about its axis.

A hollow cylindrical socket 80 is secured to the front end of the operating arm 9 and a hollow cylindrical connector 81 is rotatably held by the socket 80 as shown in FIG. 5. A front end extension or an auxiliary arm of the hollow cylindrical construction is shown at 9' and connected to the connector 81 rotatably about its own axis relative to the main arm 9. The central shaft 26 extends through the connector 81 into the auxiliary arm 9' and keyed to the auxiliary arm 9' in a known manner to transmit rotation thereto. A tool or tapping rod holder or clamping device 31 is provided on the opposite end of the auxiliary arm 9'. The clamping device 31 is adapted to clamp or release a tool or tapping rod upon axial movement of the central shaft 26 of the arm 9. The clamping device 31 can rotate about its own axis with the tool held thereon as the central shaft 26 is rotated about its own axis.

Figure 10:
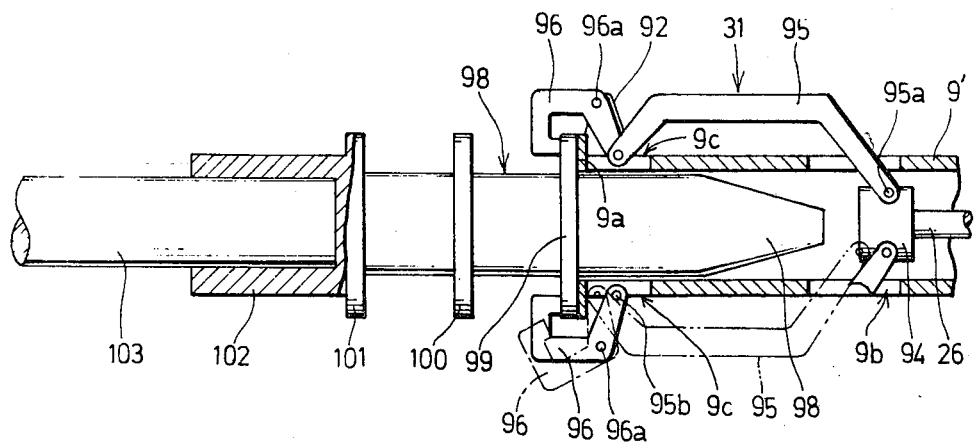
FIG. 10 is an enlarged longitudinal sectional view showing one form of the tool clamping device.

As shown in FIG. 10, the auxiliary arm 9' is formed with a radially outwardly extending annular flange 9a at its front end. Inwardly of the flange 9a, the auxiliary arm 9' is provided with two diametrically opposite pairs of brackets 92. The central shaft 26 of the arm 9 is formed with a link support 94 at its front end and the rear end of the shaft 26 is connected to the hydraulic cylinder 28 as already described or a pneumatic cylinder if desired. The clamping device 31 comprises a pair of horizontally disposed, generally arcuate links 95 and a pair of generally C-shaped clamping fingers 96 pivotally connected by pins 96a to the brackets 92 on the auxiliary arm 9'. The upper link 95 is connected to the upper clamping finger 96 by a pin 95b and the lower link 95 is connected to the lower clamping finger 96 by a pin 95b. The other or rear end of each link 95 is connected to the link support 94 by a pin 95a. The auxiliary arm 9' is formed with a pair of diametrically opposite slits 9b through which the links 95 extend outwardly of the auxiliary arm 9'. The auxiliary arm 9' is also formed with another pair of slits 9c adjacent to the flange 9a and each slit 9c provides a clearance into which the link 95 extends at its front end connected to the clamping finger 96. In its closed position as shown in FIG. 10, the clamping device 31 holds a tool holder 98 against the auxiliary arm 9'. The tool holder 98 comprises a round rod having a tapered guide surface 98a at its rear end and three longitudinally spaced flanges 99, 100 and 101. A cylindrical socket 102 is provided on the frontmost flange 101 to hold a tool 103, such as a tapping rod made of graphite carbon or metal.

Figure 11:
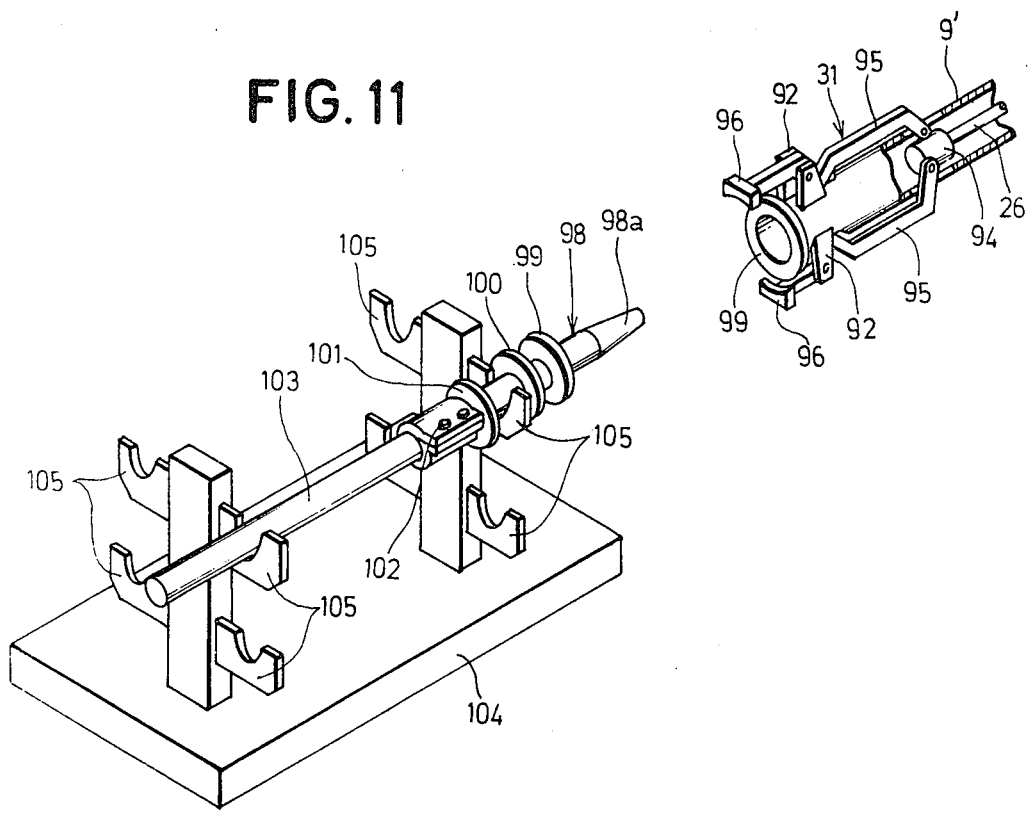
FIG. 11 is a perspective view of the device shown in FIG. 10, which illustrates the mode of clamping the tool or tapping rod to the end of the manipulator arm.

Referring to FIG. 11, there is shown a tool rest comprising a plurality of supporting arms 105 provided on a base plate 104 to support the tool 103 secured to the tool holder 98. In order to connect the tool 103 to the auxiliary arm 9' on the manipulator, the manipulator is operated to bring the arm 9 into axial alignment with the tool holder 98 and the clamping fingers 96 are opened. In order to open the fingers 96, the hydraulic cylinder 28 is actuated to move the central shaft 26 of the arm 9 forward or to the left as viewed in FIG. 10, whereby the links 95 are displaced to the position shown by broken lines to rotate the fingers 96 outwardly about the pins 96a. Then, the arm 9 is moved forward to receive the tapered end 98a of the tool holder 98 into the auxiliary arm 9' and bring the flange 9a of the auxiliary arm 9' into contact with the rearmost flange 99 on the tool holder 98. Then, the hydraulic cylinder 28 is actuated in the opposite direction to retract the central shaft 26 and the links 95, whereby the clamping fingers 96 are rotated inwardly to clamp the flange 99 against the flange 9a. After the tool 103 has finished the work for which it is intended, it may be detached from the manipulator in accordance with the opposite sequence of steps to rest again on the supporting arms 105 of the tool rest.

The operating stand 6 is provided with apparatus for manually controlling the axial movement and the vertical and horizontal rotation of the arm 9. The stand 6 also carries devices for controlling the axial movement and rotation of the central shaft 26 of the arm 9. The latter devices may comprise any known changeover switches or valves adapted for operating the hydraulic cylinder 28 or actuator 30. The central shaft 26 is rotated to rotate the tool 103 about its own axis for the purpose of preventing distortion of the tool and facilitate removal of the tool 103 from the tapping hole of the furnace in the event carbide heavily adheres to the tool and makes its smooth withdrawal difficult.

Figure 7:
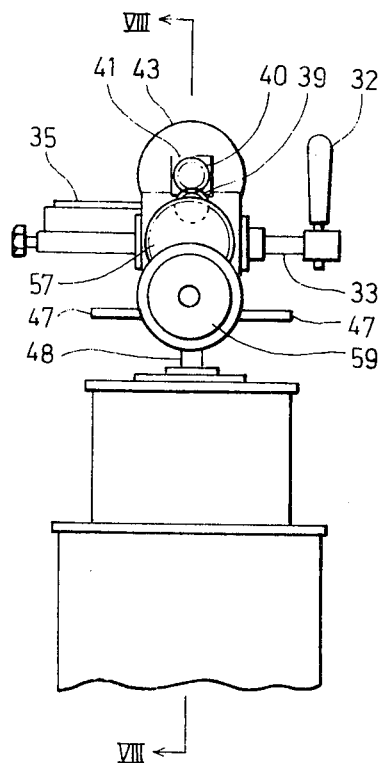
FIG. 7 is a fragmentary side elevational view of the operating handle and its associated apparatus.
Figure 8:
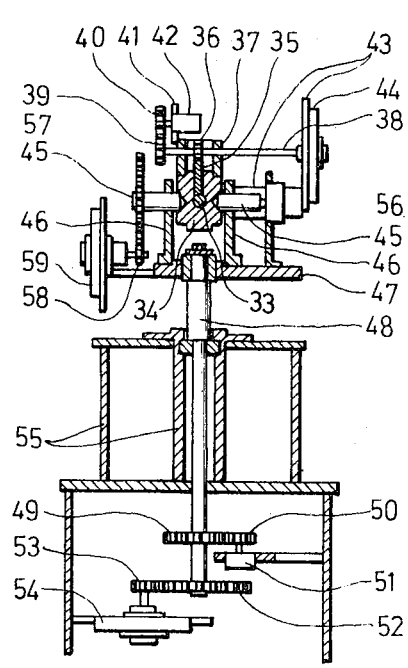
FIG. 8 is a sectional view taken along the line VIII—VIII of FIG. 7.

The apparatus for controlling the axial movement of the arm 9 includes a handle 32 connected to one end of a handle shaft 33 extending through a block 34 as shown in FIGS. 7 and 8. The handle shaft 33 carries a rack 35 thereon and the rack 35 is engaged with a gear 36 on a shaft 38 supported by bearings 37 on the block 34. A second gear 39 is secured to one end of the shaft 38 and meshes with a third gear 40 connected to a potentiometer 42 supported on a support plate 41. The other end of the shaft 38 is connected to a print motor 44 supported on a mounting plate 43.

The apparatus for controlling the horizontal rotation of the arm 9 includes an upright shaft 48 connected to a handle supporting plate 47 at its upper end as shown in FIG. 8. The handle supporting plate 47 carries a pair of bearing plates 46 on which the block 34 is supported by a pair of pins 45. A gear 49 is carried on the shaft 48 adjacent to the lower end thereof and meshes with another gear 50 connected to a potentiometer 51. A gear 52 is carried on the lower end of the shaft 48 and meshes with another gear 53 connected to a print motor 54. The shaft 48 is rotatably supported on a frame 55 and is rotatable about its own axis.

The apparatus for controlling the vertical rotation of the arm 9 includes a potentiometer 56 connected to one of the pins 45, a gear 57 carried on the other pin 45, another gear 58 meshing with the gear 57 and a print motor 59 connected to the gear 58.

Figure 9:
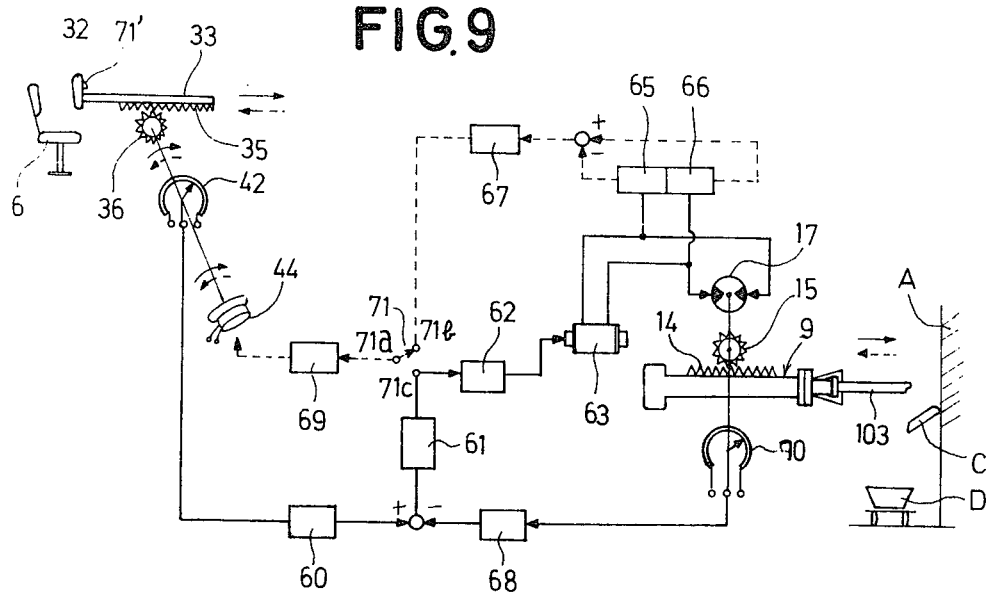
FIG. 9 is a schematic diagram for the bilateral servo system.

A bilateral servo system for the manual control of the axial movement of the arm 9 is illustrated in FIG. 9 in which the rack 35, the gear 36, the potentiometer 42 and the print motor 44 are schematically shown. The system includes a first impedance transformer 60, a first error amplifier 61, a first main amplifier 62, a servo valve 63, a first piezoelectric transducer 65, a second piezoelectric transducer 66, a second error amplifier 67, a second impedance transformer 68, a second main amplifier 69, a potentiometer 70 and a changeover relay switch 71.

When the handle 32 is operated to move the handle shaft 33 axially, rotation is transmitted to the potentiometer 42 through the rack 35 and the gears 36, 39 and 40. The brush of the potentiometer 42 is mechanically displaced over a fixed resistor. A voltage corresponding to the position of the brush is detected and transmitted through the impedance transformer 60, the error amplifier 61, the main amplifier 62 and the servo valve 63 to actuate the hydraulic motor 17. The rotation of the motor 17 is transmitted to the rack 14 through the gears 16 and 15 to move the arm 9 forward and backward, whereby the tool 103 connected to the front end of the arm 9 works on the tapping hole B of the furnace A. During such axial movement of the arm 9, the rotation of the hydraulic motor 17 is detected by the potentiometer 70 operationally connected to the hydraulic motor 17 and the potentiometer 70 transmits its output signal to the error amplifier 61 through the impedance transformer 68. The error amplifier 61 transmits to the servo valve 63 a signal representing the difference between the distance over which the handle 32 has been operated to move the arm 9 and that over which the arm 9 has actually been moved. The control circuit defined by the error amplifier 61, the main amplifier 62, the servo valve 63, the hydraulic motor 17, the potentiometer 70 and the impedance transformer 68, thus, controls the axial movement of the arm 9 to a distance corresponding to the amount of movement of the handle 32. Any load acting on the hydraulic motor 17, for example, the load bearing on the tool 103 while it is tapping the furnace A through its tapping hole B, is detected in the form of pressure differential by the piezoelectric transducers 65 and 66 connected to a different port on the hydraulic motor 17. The output signal of the piezoelectric transducers 65 and 66 is transmitted through the error amplifier 67, the switch 71 and the main amplifier 69 to the print motor 44 to rotate it in a direction opposite to the direction in which the motor 44 is rotated by the rack 35 and the gear 36 upon operation of the handle 32. Accordingly, the operator feels an increased pressure on his hands at the handle 32.

The foregoing description of the bilateral servo system has been directed to the situation in which the changeover relay switch 71 has its terminal 71a connected to a terminal 71b as shown in FIG. 9. The switch 71 is now changed over to connect the terminal 71a to another terminal 71c. If there is any positional deviation between the arm 9 and the handle 32 to create any differential between the output signals of the potentiometers 70 and 42 connected to the arm 9 and the handle 32, respectively, an error signal is transmitted from the error amplifier 61 into which the output signals of the potentiometers 70 and 42 are received through the impedance transformers 68 and 60, respectively. This error signal is transmitted to the motor 44 through the switch 71 and the main amplifier 69. The motor 44 rotates and moves the handle 32. The movement of the handle 32 continues until the position of the handle 32 coincides with that of the arm 9 and the output signal of the error amplifier 61 becomes zero. It will, thus, be understood that if the changeover switch 71 is changed over for connection between the terminals 71a and 71c at the end of one cycle of manipulator operation, any positional difference between the arm 9 and the handle 32 that may exist at the beginning of another cycle of operation can be rectified by slight movement of the handle 32, so that any dangerously large movement of the arm 9 can be prevented. The relay switch 71 may be operated by a pushbutton 71' provided on the handle 32. The pushbutton 71' may preferably be depressed for establishing the connection between the terminals 71a and 71b, and released for changing the connection to between the terminals 71a and 71c.

In order to manually control the horizontal rotation of the arm 9, the handle 32 is moved horizontally and this movement of the handle 32 is transmitted through the handle shaft 33, the block 34, the pins 45, the bearings 46 and the handle supporting plate 47 to the upright shaft 48 to rotate it about its axis. The rotation of the shaft 48 is transmitted through the gears 49 and 50 to rotate the potentiometer 51. The horizontal arm rotation may also be controlled through a feedback system similar to that of FIG. 9, though not shown in the drawings or described in any further detail.

The manual control of vertical arm rotation may be accomplished by moving the handle 32 vertically to rotate the pins 45 on the bearings 46, whereby the potentiometer 56 is rotated. The vertical arm rotation may also be controlled through a feedback system similar to that of FIG. 9, through not shown or described in further detail.

The necessary hydraulic fluid may be supplied from any appropriate hydraulic pump to the various hydraulic units through solenoid valves, throttle valves or the like. Electrohydraulic servo valves are employed to regulate the flow of hydraulic fluid for the axial, vertical and horizontal movements of the arm 9.

Figure 12:
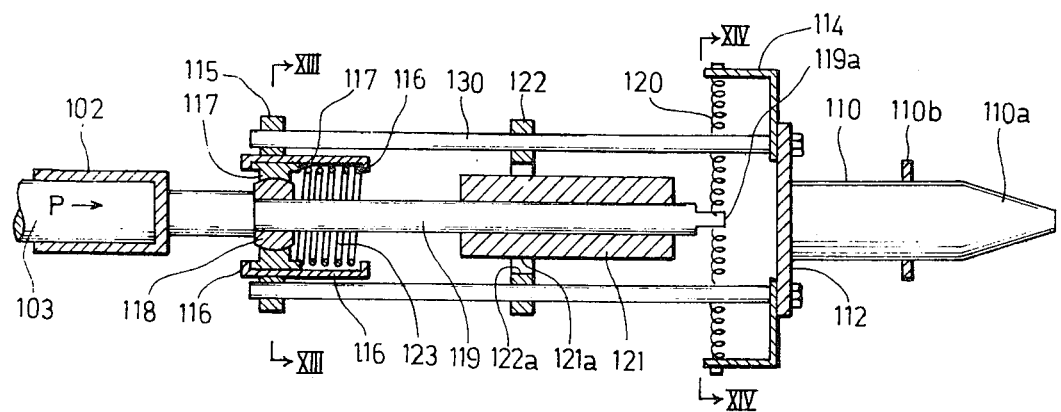
FIG. 12 is a longitudinal sectional view showing another form of the tool clamping device.
Figure 13:
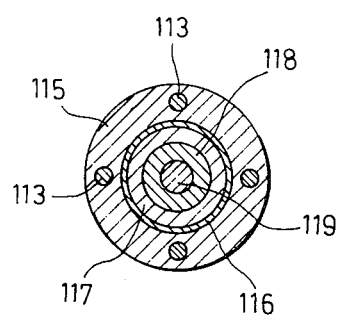
FIG. 13 is a sectional view taken along the line XIII—XIII of FIG. 12.
Figure 14:
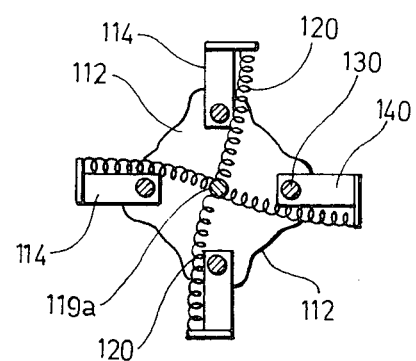
FIG. 14 is a view looking in the direction of the arrowed line XIV—XIV of FIG. 12.

Attention is now directed to FIGS. 12 to 14 showing a modified form of the tool holder. This tool holder comprises a round rod 110 having a tapered surface 110a at its rear end and a connecting plate 112 at its front end. Provided on the rod 110 between the tapered surface 110a and the connecting plate 112 is a flange 110b for connection to the arm of a manipulator by a clamping device of the sort shown at 31 in FIG. 10. The tool holder further comprises four parallel connecting rods 113 extending longitudinally of the tool holder and each having one end connected to the connecting plate 112. The connecting rods 113 are equally spaced from one another around the outer periphery of the connecting plate 112 as best shown in FIG. 14. An angle-shaped spring holding member 114 is secured to each connecting rod 113 adjacent to the connecting plate 112.

A circular holding plate 115 is connected to the other ends of the connecting rods 113. The holding plate 115 has a circular central hole in which a hollow cylindrical guide member 116 is held. An annular slide member 117 is held within the guide member 116 adjacent to its front end 116b and is slidable along the guide member 116. A compression spring 123 is disposed within the guide member 116 between the rear end 116a thereof and the rear end 117a of the slide member 117 to urge the slide member 117 toward the front end 116b of the guide member 116. A spherical bearing 118 is rotatably received in the central hole of the slide member 117. A holder shaft 119 extends through the spherical bearing 118 and has an outwardly projecting annular shoulder contacting the front surface of the bearing 118. The holder shaft 119 has an inner or rear end 119a terminating in front of the connecting plate 112. The inner end 119a is supported on four radially extending tension springs 120 connected to the spring holding members 114 and is resiliently held in axial alignment with the rod 110.

A cylindrical counterweight 121 is slidably inserted over the holder shaft 119 and is moved along the holder shaft 119 to maintain the balance between the holder shaft 119 and the tapping rod 103 relative to the bearing 118. The connecting rods 113 are supported on a reinforcing ring 122 having an inner peripheral surface 122a spaced radially outward from the outer peripheral surface 121a of the counterweight 121. Thus, any excessive rotation of the holder shaft 119 about the bearing 118 is prevented when the outer peripheral surface 121a of the counterweight 121 abuts against the inner peripheral surface 122a of the ring 122. A cylindrical socket 102 is secured to the outer end of the holder shaft 119 to hold the tapping rod 103 coaxially with the shaft 119. It will be easily understood that any pressure acting on the tapping rod 103 in the direction of the arrow P will be successfully absorbed by the spring 123 as the slide member 117 is moved inwardly. Likewise, any angular movement of the tapping rod 103 that may distort or break it can be successfully overcome by the rotation of the holder shaft 119 with the bearing 118 as its inner end 119a is resiliently supported on the springs 120. It should, however, be noted that if any such angular movement of the holder shaft 119 becomes too large to be resiliently absorbed by the springs 120, the outer peripheral surface 121a of the counterweight 121 will abut against the inner peripheral surface 122a of the ring 122 and any further force acting angularly on the tapping rod 103 may distort or even break it. Therefore, the operator must be careful to control the manipulator operation so that no such excessive angular movement will occur to the tapping rod 103. The tool holder of FIG. 12 can, thus, prevent any distortion or breakage of the tapping rod by absorbing any external force or impact that may act on the tapping rod, whether axially or angularly. It is to be understood that it is equally possible to use compression springs in place of the tension springs 120 to provide a resilient support for the inner end of the holder shaft.

Figure 15:
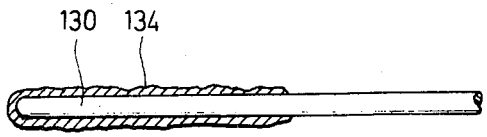
FIG. 15 is a fragmentary side elevational view of a forced cooled tapping rod.
Figure 16:
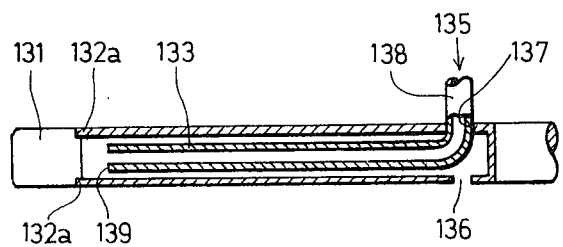
FIG. 16 is an enlarged longitudinal sectional view of the tapping rod shown in FIG. 15.
Figure 17:
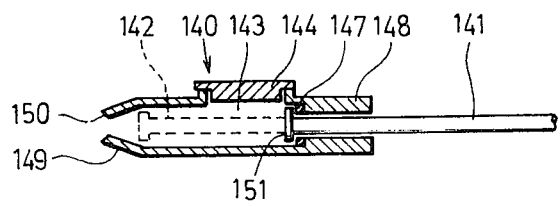
FIG. 17 is a longitudinal sectional view of a hole closing device.
Figure 18:
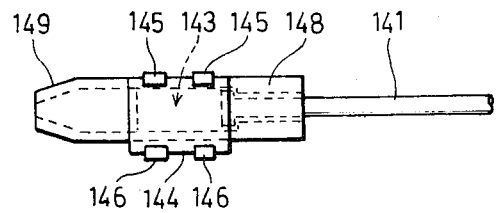
FIG. 18 is a plan view of the device shown in FIG. 17.
Figure 19:
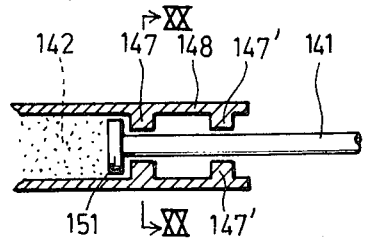
FIG. 19 is a fragmentary enlarged longitudinal sectional view od the device shown in FIG. 17.

FIGS. 15 and 16 illustrate one example of the tool of the sort shown at 103 in FIG. 10 or 12. The tool shown in FIGS. 15 and 16 is a tapping rod for a carbide furnace. The tapping rod 130 comprises a solid front end portion 131, a hollow tubular outer member 132 and a hollow tubular inner member 133 encircled by the outer member 132. Numeral 134 denotes a mass of molten carbide with which the front end portion 131 is covered when it is inserted into the tapping hole of the furnace. The front end portion 131 is welded to one end of the outer member 132 as at 132a. The outer member 132 is provided with a hole 137 in the vicinity of its other end. The inner member 133 has an outer end 138 upturned to project outwardly through the hole 137 of the outer member 132 to define an inlet for a cooling medium 135. The inner member 133 extends through the outer member 132 and terminates in an inner end 139 which defines an outlet for releasing the cooling medium 135 into the outer member 132 in front of the front end portion 131. The outer member 132 further includes an exhaust hole 136 for the cooling medium 135 in a location diametrically opposite to the upper hole 137. The cooling medium 135 may be selected from among any conventionally available coolants, including compressed air. The front end portion 131 is less likely to become worn easily without being forcibly cooled, because it is covered with a protective layer of carbide 134. The rest of the tapping rod 130 is suitably cooled and thus prevented from getting easily worn or distorted under heat.

Figure 20:
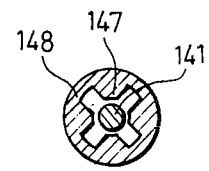
FIG. 20 is a sectional view taken along the line XX—XX of FIG. 19.

Referring to FIGS. 17 to 20, there is shown a preferred form of the device for closing a tapping hole on a carbide furnace. The closing device 140 comprises a push rod 141 formed with a flange 151 at one end and a generally cylindrical hollow body 148 having one end inserted over the flange 151 of the push rod 141. The other end of the push rod 141 is connected to the arm of a manipulator by means of a connecting and clamping device of the sort as hereinbefore described. The cylindrical body 148 is tapered at its other end 149 and has an opening 150 which defines an outlet for clay or mud 142. The body 148 is also formed with an inlet opening 143 for mud 142 which is normally closed by a cover 144. The cover 144 is hinged at one edge to the body 148 as at 145 and the opposite edge of the cover 144 is releasably fastened by a pair of clips 146. The push rod 141 is axially movable through the body 148 and when it is advanced upon forward movement of the manipulator arm, its flange 151 pushes the mud 142 out through the body opening 150 into the tapping hole of the furnace to which the outlet end 149 of the body 148 is closely positioned. The push rod 141 is retracted upon backward movement of the manipulator arm until its flange 151 abuts on a flange 147 formed on the inner surface of the body 148, so that the body 148 can receive a fresh supply of clay or mud through the inlet opening 143. The flange 147 is preferably formed with a number of circumferentially spaced slits as shown in FIG. 20 to facilitate removal of any mud that may enter the clearance between the flange 147 and the flange 151 on the push rod 141. Numeral 147' indicates another flange formed on the inner surface of the body 148 adjacent to the end thereof to support the push rod 141 in axial alignment with the body 148. The stroke of forward movement of the push rod 141 may advantageously be varied to adjust the amount of mud to be delivered to suit the size and shape of the tapping hole to be closed. The tapering degree of the front end of the body 148 is preferably varied to suit the material used for closing the tapping hole, which depends on the kind of the product to be manufactured by the furnace. If the furnace is to manufacture calcium silicon, for example, the closing device had better be designed without a tapered end, because such a furnace employs wooden material to close the tapping hole. On the other hand, the device for closing the tapping hole of a carbide furnace is most preferably tapered at its outlet end as hereinbefore described.

Although the invention has been described with reference to a preferred embodiment thereof, it is to be understood that modification or variation may be made by anybody of ordinary skill in the art without departing from the scope of the invention which is defined by the appended claims.

What is claimed is:
1. A manipulator comprising:
   (i) a support structure
   (ii) an arm supported on said support structure, said arm being hollow and being provided with a central shaft which extends axially through said arm and which is axially movable and rotatable about its own axis, said arm being rotatable in a vertical and in a horizontal plane,
   (iii) a hydraulic cylinder connected to one end of said central shaft to axially move said central shaft
   (iv) a hydraulic actuator connected to said central shaft to rotate it about its axis
   (v) a hollow auxiliary arm connected at one end to said arm and to the other end of said central shaft and rotatable about its own axis upon said rotation of said central shaft,
   (vi) means provided on said support structure for rotating said hollow arm in said vertical plane,
   (vii) means provided on said support structure for rotating said hollow arm in said horizontal plane,
   (viii) a tool holder comprising a rod having one end adapted for insertion in said auxiliary arm, a tool holding member provided on the other end of said rod, and a radially outwardly projecting flange provided on said rod intermediate said ends thereof, said tool holder being adapted to resiliently support a tool relative to said auxiliary arm, (ix) means carried on said arm for clamping said tool holder to said arm, said clamping means comprising a plurality of clamping fingers connected to the other end of said auxiliary arm and rotatable in a radial plane of said auxiliary arm, and a plurality of links each having one end connected to one end of one of said clamping fingers, the other end of each said link being connected to the other end of said central shaft, said links being axially movable with said axial movement of said central shaft to cause said rotation of said clamping fingers, said auxiliary arm including a radially outwardly extending flange formed at said other end thereof against which said clamping fingers can clamp said tool holder at the other ends thereof to connect said tool holder to said arm, and a plurality of openings formed in said auxiliary arm in the vicinity of said other ends of said links, each of said links extending through one of said openings, (x) means provided on said support structure for operating said axially arm moving means, said vertically arm rotating means, and said horizontally arm rotating means, and (xi) a servo system provided on said support structure for adapting the axial movement of said arm to operation of said operating means and for feeding back to said operating means an external force acting on said arm.

2. The manipulator, as claimed in claim 1, wherein said tool holder comprises:

(a) a rod adapted for connection at one end to said auxiliary arm by said clamping fingers;

(b) a plurality of connecting members each having one end connected to the other end of said rod;

(c) a plurality of first springs lying in a plane parallel to the radial plane of said rod and each connected to said one end of one of the connecting members;

(d) a cylindrical guide member supported on the other ends of said connecting members coaxially with said rod;

(e) a spherical bearing mounted rotatably and slidably within said guide member;

(f) a second spring provided within said guide member to resiliently support said spherical bearing; and (g) a holder shaft having one end provided with a tool holding member, said holding shaft being supported on said spherical bearing and terminating at its other end supported on said first springs, whereby said holder shaft is capable of axial movement and rotation about said spherical bearing upon application of impact onto said one end thereof.

3. A manipulator for tapping a furnace, comprising:
a mobile undercarriage;
an arm supported on said undercarriage, said arm being axially movable and rotatable in vertical and horizontal planes;
means provided on said undercarriage for axially moving said arm and including a hydraulic motor mounted on an arm supporting plate, gear means connected to said hydraulic motor and an elongate rack provided on said arm along the length thereof and engaged with said gear means;

means provided on said undercarriage for rotating said arm in said vertical plane and including a horizontal pin connected to said arm supporting plate at right angles to the longitudinal axis of said arm and a vertically disposed hydraulic cylinder connected to said arm supporting plate for operation to rotate said arm supporting plate in a vertical plane about said pin to thereby rotate said arm in said vertical plane;

means provided on said undercarriage for rotating said arm in said horizontal plane and including a hydraulic motor supported on said undercarriage, an upright shaft connected to a frame secured to said arm supporting plate and rotatable about its own axis, and gear means interposed between said last mentioned hydraulic motor and said upright shaft to transmit rotation of said last mentioned hydraulic motor to said upright shaft to rotate said upright shaft about said axis thereof, whereby said frame and said arm supporting plate are rotated horizontally to rotate said arm in said horizontal plane;

means carried on said arm for clamping a tool holder to said arm;

means provided on said undercarriage for operating said axially arm moving means and including a handle shaft carrying a longitudinally extending rack thereon, an operating handle connected to one end of said handle shaft, a block supporting said handle shaft, gear means carried on a gear shaft on said block and engaged with said rack on said handle shaft, a potentiometer connected to one end of said gear shaft and a motor connected to the other end of said gear shaft, said operating handle being movable horizontally along the axis of said handle shaft to thereby control said axially arm moving means;

means provided on said undercarriage for operating said horizontally arm rotating means and including an upright shaft having an upper end connected to a supporting plate on which said block is supported, a potentiometer connected to said last mentioned upright shaft adjacent to the lower end thereof and a motor connected to said lower end of said upright shaft, said operating handle being movable horizontally across said axis of said handle shaft to thereby control said horizontally arm rotating means;

means provided on said undercarriage for operating said vertically arm rotating means and including a pair of horizontal pins connected to said block, a potentiometer connected to one of said pair of horizontal pins and a motor connected to the other of said pair of horizontal pins, said operating handle being movable vertically to control said vertically arm rotating means;

a servo system provided on said undercarriage for adapting the axial movement of said arm to operation of said operating means to feed back to said operating means an external force acting on said arm during the tapping of said furnace; and an operating stand provided on said undercarriage opposite to said operating handle and positioned to permit the operator on said operating stand to watch the free end of a tool carried on said tool holder.

4. The manipulator as defined in claim 3, wherein said servo system includes:

a potentiometer operationally connected to said hydraulic motor;

an error amplifier adapted to receive an output signal of said last mentioned potentiometer and an output signal of said potentiometer on said gear shaft to transmit an output signal representing the difference between said output signals; and a servo valve responsive to said output signal of said error emplifier to regulate supply of working fluid to said hydraulic motor, whereby the amount of the axial movement of said arm is controlled to conform to the amount of movement of said operating handle along the axis of said handle shaft.

5. The manipulator as defined in claim 4, wherein said servo system includes:

a pair of piezoelectric transducers connected respectively to a pair of ports in said hydraulic motor to detect pressures at said ports; and an error amplifier adapted to detect the difference between the outputs of said piezoelectric transducers and transmit an output signal to said motor on said gear shaft, whereby said last mentioned motor is rotated in a direction opposite to that in which it is rotated by operation of said operating handle.

6. The manipulator as defined in claim 5, including a changeover switch provided between said two error amplifiers and said last mentioned motor.

7. The manipulator as defined in claim 4, wherein said arm is of the hollow construction and provided with a central shaft which axially extends through said arm and which is axially movable along said arm and rotatable about its own axis.

* * * * *